Patented Sept. 5, 1933

1,925,410

UNITED STATES PATENT OFFICE 1,925,410

CHLORINATION PRODUCTS OF ISODIBENZANTHRONE AND PROCESS OF MANUFACTURING SAME

Hugo Siebenbürger, Basel, Switzerland, assignor to Society of Chemical Industry in Basle, Basel, Switzerland No Drawing. Application September 18, 1930, Serial No. 482,909, and in Great Britain October 3, 1929

5 Claims. (Cl. 260—61)

This invention relates to new chlorination products of isodibenzanthrone which are of value for the production of fast violet tints. It comprises the process of making these products, as well as the products themselves.

Many halogenated products of isodibenzanthrone have been described in literature. All these products and isobenzanthrone itself, which dye cotton in a vat more or less vivid reddish to bluish-violet tints, have the disadvantage that the dyeings are sensitive to water, in that they show spots where drops of water have come in contact with the dyed fabric. This is particularly the case with the products which are on the market under the names Cibanone violet R or Indanthrene brilliant violet RR (cf. Color Index No. 1104) or with the higher halogenated products which are for example obtained according to the process of the United States Patent specification No. 1,525,117.

According to the present invention new chlorination products of isodibenzanthrone, yielding dyeings on cotton which are completely fast to water, are made by chlorinating isodibenzanthrone in presence of a halogen carrier or by means of a halogenating agent which is itself a halogen carrier, the chlorination being so conducted that more than two chlorine atoms are introduced into the isodibenzanthrone molecule.

The chlorination is of course expediently carried out in the presence of such diluents which themselves are indifferent or almost indifferent towards chlorine in the presence of a chlorine carrier. Such diluents are for example nitrobenzene or trichlorobenzene.

This invention, which could not have been foreseen, constitutes an important technical advance in the manufacture of dyestuffs derived from benzanthrone.

The following examples illustrate the invention, the parts being by weight:—

*Example 1*

60 parts of very finely powdered, purified isodibenzanthrone, made for example as described in U. S. Patent specification No. 1,580,062, Example 1, are suspended in 900 parts of nitrobenzene. At the usual temperature there are dropped into the suspension, while stirring well and in the course of ¼ hour, 180 parts of antimony pentachloride; a slight rise of temperature ensues. The temperature is now gradually raised to 190° C. The chlorination proper, recognizable by the strong generation of hydrochloric acid, begins at about 140° C. After the temperature has attained 190° C. the mass is heated for ½ hour at 190–200° C., then cooled to 75° C. and kept for ¼ hour at 70–75° C. By filtration the dyestuff is isolated; after careful washing with nitrobenzene and alcohol it is dried.

The new halogenated dyestuff thus obtained is a dark violettish powder, soluble in concentrated sulfuric acid to an olive colored solution. When this solution is poured into water blue-violet flocks separate. The dyestuff yields a greenish-blue vat and dyes the fiber blue. After oxidizing and soaping there is obtained a bluish-violet dyeing fast to water.

*Example 2*

60 parts of very finely powdered, purified isodibenzanthrone are suspended in 900 parts of nitrobenzene. The suspension is heated to 100° C. and 3 parts of iodine are added. Then, while stirring well, 150 parts of sulfuryl chloride are dropped in in the course of ½ hour, the temperature being 100 to 105° C. At the end of this operation the mass is kept for 3 hours at the last-named temperature, while stirring. The product is worked up as described in Example 1.

The new halogenated dyestuff is a dark violettish powder. It dissolves in concentrated sulfuric acid to a green-olive solution, which yields a precipitate of blue-violet flocks. The dyestuff yields a vat which is green-blue and the soaped bluish-violet dyeing does not become redder when spotted with water.

*Example 3*

60 parts of very finely pulverized, purified isodibenzanthrone are suspended in 900 parts of nitrobenzene and the suspension is heated to 100° C. At this temperature 3 parts of iodine are added and there is passed through the suspension in a slow stream, 90 parts of chlorine, the operation occupying some hours, the temperature being 100–105° C. After cooling to 70° C. the product is worked up as described in Example 1. The dyestuff obtained has the same properties as those of the dyestuff of the preceding example.

In the preceding three example other suitable diluents may be used instead of nitrobenzene, such for example as trichlorobenzene.

*Example 4*

Into 750 parts of trichlorobenzene, contained in a closed iron stirring vessel, are introduced 40 parts of very finely pulverized, purified isodibenzanthrone and the suspension is heated to about 140° C. At a temperature of 140-150° C. there are introduced in small portions 240 parts of anhydrous ferric chloride. Towards the end of the introduction considerable quantities of hydrochloric acid gas escape. The whole is maintained at the last-named temperature for 3 hours, and is then cooled to about 100° C., when the contents of the vessel are filtered and trichlorobenzene is expelled from the solid matter by means of steam. The dyestuff is repeatedly boiled with dilute hydrochloric acid to separate iron and then washed free from acid and dried.

The halogenated dyestuff dissolves in concentrated sulfuric acid to a green olive solution from which, when it is poured into water, dull blue-violet flocks separate. The dyestuff forms a blue-green vat which dyes cotton strong bluish-violet, fast to water.

What I claim is:—

1. As a new process the chlorination of isodibenzanthrone to a chlorination product containing more than two chlorine atoms, consisting in chlorinating isodibenzanthrone in the presence of iodine.

2. As a new process the chlorination of isodibenzanthrone to a chlorination product containing more than two chlorine atoms, consisting in chlorinating isodibenzanthrone in the presence of iodine with sulfuryl chloride.

3. As a new process the chlorination of isodibenzanthrone to a chlorination product containing more than two chlorine atoms, consisting in chlorinating isodibenzanthrone in the presence of iodine with chlorine.

4. As a new product of manufacture, a chlorinated isodibenzanthrone obtainable by chlorinating isodibenzanthrone in the presence of iodine until more than two chlorine atoms are added, said chlorinated isodibenzanthrone being adapted to form vats which dye cotton clear bluish tints which are fast to water, said chlorinated isodibenzanthrone, in the dry state, forming a dark violet powder which dissolves in concentrated sulfuric acid to olive and in caustic alkaline sodium hydrosulfite solutions to green-blue solutions.

5. As a new product of manufacture, a chlorinated isodibenzanthrone obtainable by chlorinating isodibenzanthrone in the presence of iodine until more than three chlorine atoms are added, said chlorinated isodibenzanthrone being adapted to form vats which dye cotton clear bluish tints which are fast to water, said chlorinated isodibenzanthrone, in the dry state, forming a dark violet powder which dissolves in concentrated sulfuric acid to olive and in caustic alkaline sodium hydrosulfite solutions to green-blue solutions.

HUGO SIEBENBÜRGER.